H. J. KIMMAN.
CONNECTING ROD FOR DRILLS, ETC.
APPLICATION FILED SEPT. 24, 1919.

1,423,614.

Patented July 25, 1922.
2 SHEETS—SHEET 2.

Witness
Martin H. Olsen.

Inventor
Henry J. Kimman
By Rector, Hibben, Davis & Macauley
His Attys.

UNITED STATES PATENT OFFICE.

HENRY J. KIMMAN, OF CLEVELAND, OHIO, ASSIGNOR TO CHICAGO PNEUMATIC TOOL COMPANY, OF CHICAGO, ILLINOIS, A CORPORATION OF NEW JERSEY.

CONNECTING ROD FOR DRILLS, ETC.

1,423,614.  Specification of Letters Patent.  Patented July 25, 1922.

Application filed September 14, 1919. Serial No. 325,902.

*To all whom it may concern:*

Be it known that I, HENRY J. KIMMAN, a citizen of the United States, residing at Cleveland, in the county of Cuyahoga and State of Ohio, have invented certain new and useful Improvements in Connecting Rods for Drills, Etc., of which the following is a specification.

My invention pertains to connecting rods for drills and the like, more particularly to the short connecting rods such as used in multiple cylinder drills as exemplified in prior United States patents issued to me, for instance, Patent No. 653,248, dated July 10, 1900. The object of my invention is to provide a novel and efficient construction of connecting rod including the cooperating bushing for connecting the two opposing pistons to the same crank of the crank shaft. The construction and arrangement is such that when the casing of the drill is open for inspection or repair of the parts, the connecting rods which sometimes break or become damaged and thereby need replacement are fully exposed and capable of ready and instant repair or removal.

Figure 1:
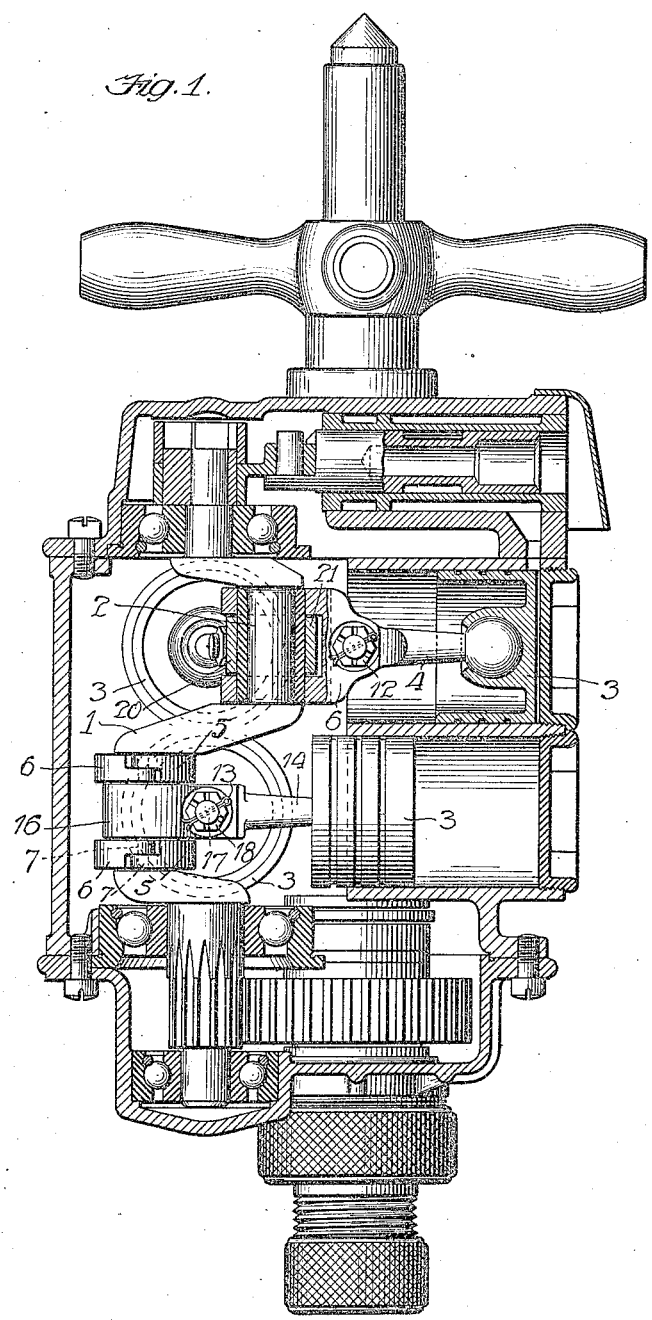
Figure 2:
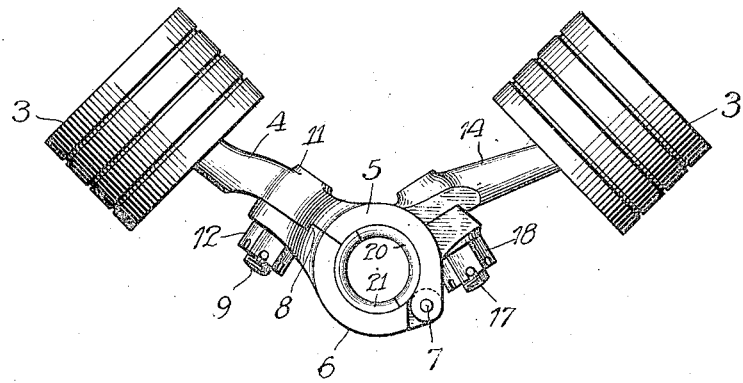
Figure 3:
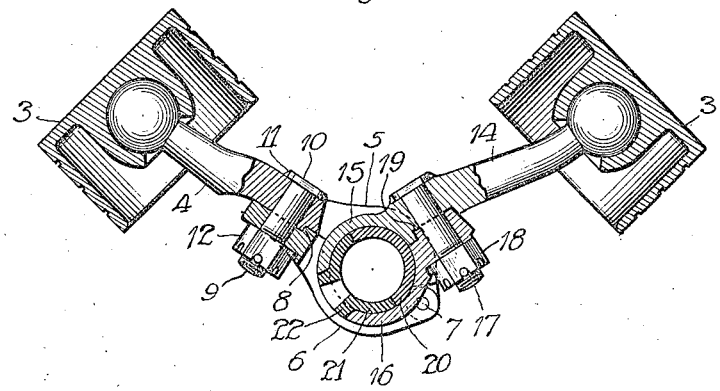
Figure 4:
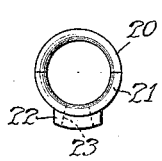
Figure 5:
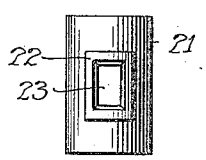
Figure 6:
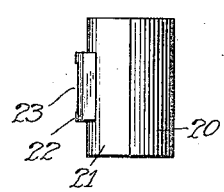

In the drawings Fig. 1 is a sectional elevation of a drill illustrating connecting rods embodying my invention; Fig. 2 an elevation of two opposing pistons and their connecting rods shown removed from the drill; Fig. 3 a sectional elevation of the parts shown in Fig. 2; and Figs. 4, 5 and 6 elevations from different positions of the bushing.

Referring to the particular embodiment of my invention as herein shown, as well as its incorporation in a particular type of drill, such drill comprises essentially a crank shaft 1 having two cranks such as 2, each of which cooperates with a pair of similar opposed pistons 3 through the medium of the connecting rods which constitute the basis of this invention. One of the connecting rods 4 is provided at its inner end with a pair of parallel straps or bearing members encircling the crank and also encircling the bushing hereinafter described. Each strap comprises two parts 5 and 6 which are pivoted to each other by the pins 7. These two parts also have interlocking connection by means of the opposing shoulders indicated at 8, and the same are held clamped together by means of the transverse bolt 9 having an angular head 10 held within a correspondingly angular socket in a boss 11 in the member or part 5 of the strap. This bolt has a castellated nut 12 and the same is held against rotation by the cotter pin 13 cooperating therewith.

The other connecting rod 14 has at its inner end a strap or bearing member formed in two parts and located between the parallel straps of the other connecting rod. The two parts of this strap are indicated at 15 and 16, the latter being bodily removable from the other part but held clamped thereto by means of the bolt 17 and nut 18, which is similar to the nut 9 and its nut 12. These two parts 15 and 16 also have interlocking shoulders as indicated at 19.

The parts are so constructed that the nuts 12 and 18 are readily accessible and may be removed by means of a suitable tool such as a socket wrench, whereupon the parts or members of the straps can be removed for repair or replacement purposes.

Referring to the bushing the same comprises two parts 20 and 21 which are divided on a diametrical plane. The part 21 is secured to the inside strap, that is, the one associated with the head 14, by being interlocked therewith. As shown in Figs. 3 to 6 the part 21 has a radial extension 22 which is clamped between the outer ends of the parts 15 and 16. This extension 22 is preferably provided with an oil opening 23 whereby the oil within the drill will find its way into the bearing between the crank and the bushing.

The construction and arrangement of parts above described provides for ready removal and replacement of parts, and at the same time provides connecting rods with bearing members having great strength considering the necessary comparatively small size thereof.

I claim:

1. Connecting means between the crank shaft and pistons of a multiple cylinder engine consisting of two connecting rods, and a bushing cooperating with said rods and having a perforated projecting portion, the inner or bearing end of one of the rods having an opening to receive such projecting portion.

2. Connecting means between the crank shaft and pistons of a multiple cylinder engine consisting of two connecting rods, and connected with the same crank and each having removable bearing members, the bearing members of one rod comprising a pair of parallel straps encircling the crank and the bearing members of the other rod comprising an intermediate strap also encircling the crank and located between said pair of straps, and a bushing cooperating directly with the crank and having an integral projecting portion, said intermediate strap having an opening to receive said integral projecting portion.

3. Connecting means between the crank shaft and pistons of a multiple cylinder engine consisting of two connecting rods, and connected with the same crank and each having removable bearing members, the bearing members of one rod comprising a pair of parallel straps encircling the crank and the bearing members of the other rod comprising a strap also encircling the crank and located between said pair of straps, such strap being formed in two removable parts, and a bushing cooperating directly with the crank and having a radial projection on its outer face held clamped between the outer end of said two parts of the strap.

4. Connecting means between the crank shaft and pistons of a multiple cylinder engine consisting of two connecting rods and connected with the same crank and each having removable bearing members, the bearing members of one rod comprising a pair of parallel straps encircling the crank and the bearing members of the other rod comprising a strap also encircling the crank and located between said pair of straps, such strap being formed in two removable parts, and a bushing cooperating directly with the crank and having a radial projection provided with a transverse opening extending into the bushing bore and held clamped between the outer ends of said two parts of the strap.

5. Connecting means between the crank shaft and pistons of a multiple cylinder engine consisting of two connecting rods, and connected with the same crank and each having removable bearing members, the bearing members of one rod comprising a pair of parallel straps encircling the crank and the bearing members of the other rod comprising a strap also encircling the crank and located between said pair of straps, said strap being formed in two parts, a single transverse bolt and interlocking shoulders for securing said two parts together, and said pair of straps being formed in two parts, a transverse bolt for securing said latter two parts together, and a bushing with which all said straps cooperate.

6. Connecting means between the crank shaft and pistons of a multiple cylinder engine consisting of two connecting rods, and connected with the same crank and each having removable bearing members, the bearing members of one rod comprising a pair of parallel straps encircling the crank and the bearing members of the other rod comprising a strap also encircling the crank and located between said pair of straps, said strap being formed in two parts, a transverse bolt for securing said two parts together, and said pair of straps being formed in two parts, a transverse bolt for securing said latter two parts together, the two parts of said pair of straps being pivoted to each other and the two parts of the other strap being bodily removable one from the other.

7. Connecting means between the crank shaft and pistons of a multiple cylinder engine consisting of two connecting rods, and connected with the same crank and each having removable bearing members, the bearing members of one rod comprising a pair of parallel straps encircling the crank and the bearing members of the other rod comprising a strap also encircling the crank and located between said pair of straps, said strap being formed in two parts, a transverse bolt for securing said two parts together, and said pair of straps being formed in two parts, a transverse bolt for securing said latter two parts together, the two parts of each set of straps having interlocking shoulders located adjacent said bolt and between it and the bearing of said straps.

HENRY J. KIMMAN.